United States Patent
Kallas et al.

(10) Patent No.: US 11,860,909 B2
(45) Date of Patent: Jan. 2, 2024

(54) ENTITY HOUSEHOLD GENERATION BASED ON ATTRIBUTE-PAIR MATCHING

(71) Applicant: U.S. Bancorp, National Association

(72) Inventors: Christopher Kallas, Grafton, WI (US); Xiaoqiao Wei, Woodbury, MN (US); Ding Ma, Thousand Oaks, CA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 186 days.

(21) Appl. No.: 17/409,262

(22) Filed: Aug. 23, 2021

(65) Prior Publication Data

US 2023/0053567 A1 Feb. 23, 2023

(51) Int. Cl.
*G06F 16/28* (2019.01)
*G06F 16/23* (2019.01)
*G06F 16/2457* (2019.01)
*G06F 16/2455* (2019.01)

(52) U.S. Cl.
CPC ............ *G06F 16/288* (2019.01); *G06F 16/23* (2019.01); *G06F 16/24565* (2019.01); *G06F 16/24573* (2019.01)

(58) Field of Classification Search
CPC .. G06F 16/288; G06F 16/24573; G06F 16/23; G06F 16/24565
USPC ........................................................ 707/802
See application file for complete search history.

(56) References Cited

U.S. PATENT DOCUMENTS

| | | | |
|---|---|---|---|
| 7,627,550 B1 | 12/2009 | Adams et al. | |
| 8,713,414 B2 | 4/2014 | Kamuf et al. | |
| 8,799,282 B2 | 8/2014 | Goldenberg et al. | |
| 9,600,563 B2* | 3/2017 | Ford | G06F 16/285 |
| 10,983,983 B2 | 4/2021 | Kallas et al. | |
| 11,474,987 B1* | 10/2022 | Stein | G06F 16/538 |
| 2005/0021551 A1 | 1/2005 | Silva et al. | |
| 2007/0276858 A1 | 11/2007 | Cushman et al. | |
| 2008/0243885 A1 | 10/2008 | Harger et al. | |
| 2017/0308557 A1* | 10/2017 | Cassidy | G06N 20/00 |
| 2019/0278855 A1* | 9/2019 | Kallas | G06F 16/2365 |
| 2019/0361845 A1* | 11/2019 | Faith | G06Q 50/01 |
| 2021/0357378 A1* | 11/2021 | Urdiales | G06F 16/215 |

OTHER PUBLICATIONS

Furong Li, Mong Li Lee, Wynne Hsu, Wang-Chiew Tan; "Linking Temporal Records for Profiling Entities"; Jun. 2015; Australia.*
Beaman et al., "Do Household Definitions Matter in Survey Design? Results from a Randomized Survey Experiment in Mali," (2011) pp. 1-34.

(Continued)

*Primary Examiner* — Giovanna B Colan
(74) *Attorney, Agent, or Firm* — Foley & Lardner LLP

(57) ABSTRACT

A method comprises storing a plurality of entity profiles; applying a predetermined first set of rules to a plurality of attribute-value pairs of the plurality of entity profiles; identifying a first set of entity profiles that satisfy the predetermined first set of rules; identifying a second set of entity profiles that satisfy the predetermined second set of rules; and updating a first attribute-value pair of the first and second sets of entity profiles by adding a first label to the first attribute-value pair responsive to determining the first set of entity profiles and the second set of entity profiles share a common entity profile.

17 Claims, 5 Drawing Sheets

(56) References Cited

OTHER PUBLICATIONS

"Subject Definitions" co-sponsored by US Bureau of Labor Statistics, census.gov/programs-surveys/cps/technical-documentation/subject-definitions.html#household, last revised Sep. 27, 2020, 23 pages.
Final Office Action on U.S. Appl. No. 15/915,864 dated Sep. 18, 2020.
HealthCare.gov; "How to Count Income and Household Members", healthcare.gov/income-and-household-information/household-size/; 5 pages.
Non-Final Office Action on U.S. Appl. No. 15/915,864 dated May 28, 2020.
Non-Final Office Action on U.S. Appl. No. 15/915,864 dated Dec. 24, 2020.
Notice of Allowance on U.S. Appl. No. 15/915,864 dated Mar. 11, 2021.
Glossary of Statistical Terms, stats.oecd.org/glossary/detail.asp?ID=1255, last updated Jul. 29, 2002, 1 page.

* cited by examiner

| | | |
|---|---|---|
| Name | Jane Doe | — 302 |
| Account Number | #089A5261 | — 304 |
| Phone Number | (123)456-7890 | — 306 |
| Email Address | Jane@acme.com | — 308 |
| Address | 15 Elm Street, Los Angeles CA 90210 | — 310 |
| Group Entity | | — 312 |

FIG. 3

ENTITY HOUSEHOLD GENERATION BASED ON ATTRIBUTE-PAIR MATCHING

BACKGROUND

The proliferation of storage and network devices enables a large amount of data to be exchanged and stored. A large amount of data allows analysis or predictions that were not feasible before. For example, a big data analysis performed on millions of entity profiles may enable online behavior predictions of consumer behavior for entity profiles of the same group entity through a statistical analysis.

In some instances, a company entity may wish to identify and filter data based on relationships between the data. For instance, given a list of different profiles for different people, it may be useful to determine how those profiles are related to each other and whether they should be considered to be a part of the same group when the data associated with the profiles is analyzed. Common methods to do so are to group profiles based on manually input attributes in the profiles that match. However, oftentimes when using such methods to group profiles, the profiles may be misclassified or grouped into the wrong group. This may occur because the wrong data may be used to group the profiles and may render any analysis on the group meaningless.

Furthermore, in instances in which groupings are meant to be used to filter different profiles, such filters may be performed based on hardcoded attributes or values within the profiles (e.g., profiles that share a common value may be filtered together). Computers are often not equipped to filter profiles or otherwise group such profiles based on their relationships without having a common value. This problem may become even more pronounced when the profiles are generated via a manual data entry, which can often produce typographical errors in the profiles that may cause the computers to misclassify the data or otherwise not include profiles to be in the correct grouping.

SUMMARY

At least one aspect of a technical solution to the aforementioned problem is directed to a method. The method may comprise storing, by one or more processors, a plurality of entity profiles, each of the plurality of entity profiles associated with a different entity and comprising a plurality of attribute-value pairs; applying, by the one or more processors, a predetermined first set of rules to the plurality of attribute-value pairs of the plurality of entity profiles; identifying, by the one or more processors, a first set of entity profiles that satisfy the predetermined first set of rules based on the first set of entity profiles having a matching first set of attribute-value pairs; applying, by the one or more processor, a predetermined second set of rules to the plurality of attribute-value pairs of the plurality of entity profiles; identifying, by the one or more processors, a second set of entity profiles that satisfy the predetermined second set of rules based on the second set of entity profiles having a matching second set of attribute-value pairs; and updating, by the one or more processors, a first attribute-value pair of the first and second sets of entity profiles by adding a first label to the first attribute-value pair responsive to determining the first set of entity profiles and the second set of entity profiles share a common entity profile, the first label linking the first and second sets of entity profiles.

At least one aspect of this technical solution is directed to a system. The system may comprise one or more hardware processors configured by machine-readable instructions to store a plurality of entity profiles, each of the plurality of entity profiles associated with a different entity and comprising a plurality of attribute-value pairs; apply a predetermined first set of rules to the plurality of attribute-value pairs of the plurality of entity profiles; identify a first set of entity profiles that satisfy the predetermined first set of rules based on the first set of entity profiles having a matching first set of attribute-value pairs; apply a predetermined second set of rules to the plurality of attribute-value pairs of the plurality of entity profiles; identify a second set of entity profiles that satisfy the predetermined second set of rules based on the second set of entity profiles having a matching second set of attribute-value pairs; and update a first attribute-value pair of the first and second sets of entity profiles by adding a first label to the first attribute-value pair responsive to determining the first set of entity profiles and the second set of entity profiles share a common entity profile, the first label linking the first and second sets of entity profiles.

At least one aspect of this technical solution is directed to a non-transitory computer-readable storage medium having instructions embodied thereon, the instructions being executable by one or more processors to perform a method. The method may comprise storing a plurality of entity profiles, each of the plurality of entity profiles associated with a different entity and comprising a plurality of attribute-value pairs; applying a predetermined first set of rules to the plurality of attribute-value pairs of the plurality of entity profiles; identifying a first set of entity profiles that satisfy the predetermined first set of rules based on the first set of entity profiles having a matching first set of attribute-value pairs; applying a predetermined second set of rules to the plurality of attribute-value pairs of the plurality of entity profiles; identifying a second set of entity profiles that satisfy the predetermined second set of rules based on the second set of entity profiles having a matching second set of attribute-value pairs; and updating a first attribute-value pair of the first and second sets of entity profiles by adding a first label to the first attribute-value pair responsive to determining the first set of entity profiles and the second set of entity profiles share a common entity profile, the first label linking the first and second sets of entity profiles.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is an illustration of an example entity profile, in accordance with an implementation;

DETAILED DESCRIPTION

Figure 1:
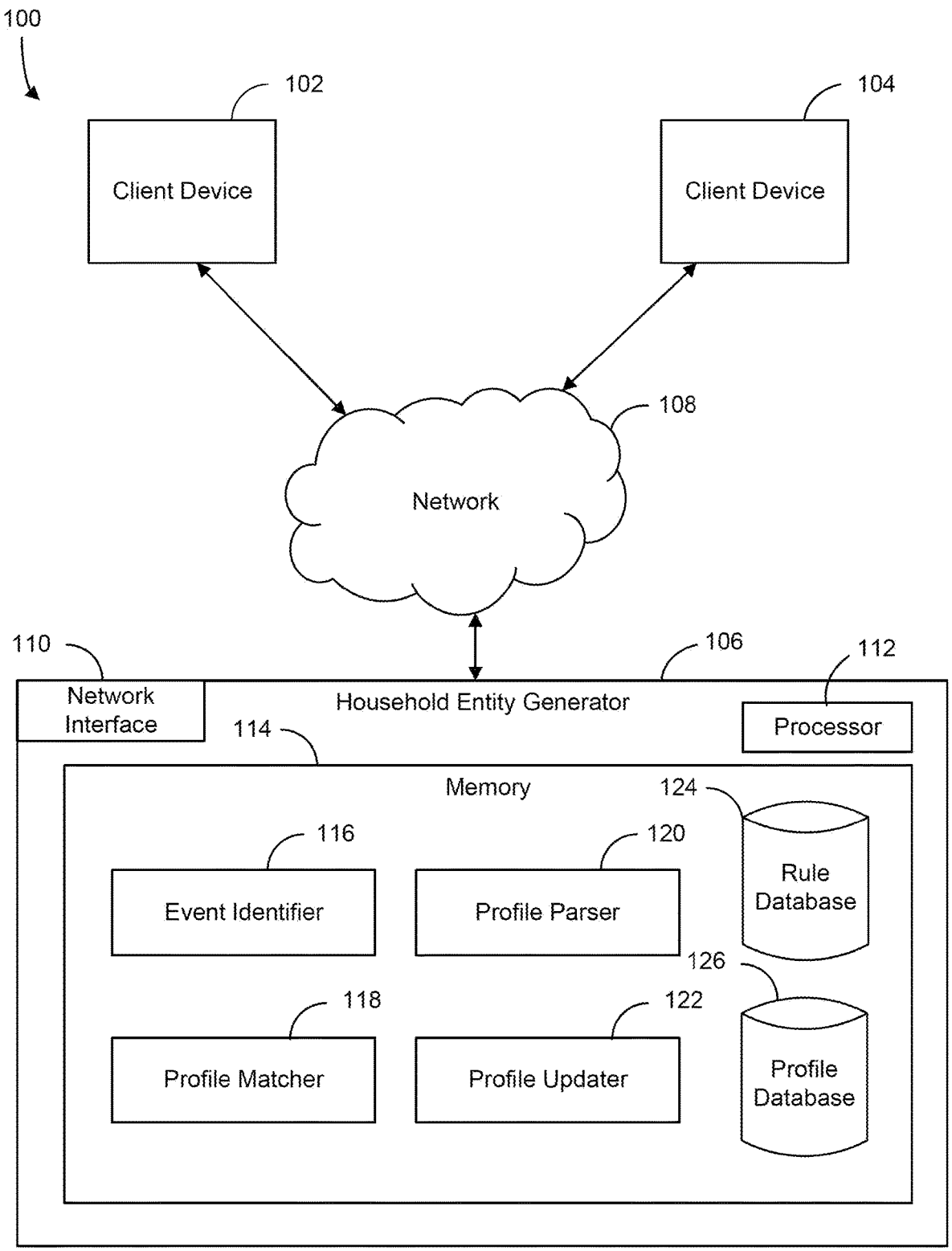
FIG. 1 is an illustration of a system for household entity generation, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, computers are liable to misclassify data into different groupings when filtering the data, especially when such classifications rely on data that is manually input and likely to include typographical errors. When computers are performing these classifications based on different relationships between the computer data, such as identifying profiles that are owned by different entities that are a part of the same household, this problem can become even more pronounced given the amount of data that is stored in each profile (e.g., a computer may inadvertently match different entity profiles into the same grouping if they have one value in common (such as a common first name), despite the profiles not being related). Computers will often rely only on pre-stored data when creating different entity profile groupings without the capability to identify groupings of entity profiles that do not share a common attribute. For instance, a computer may easily group two profiles together that share a matching grouping attribute, but the computer may not be able to group the profiles together if the value of the grouping attribute is missing from one or both of the profiles. Accordingly, when an operator attempts to filter different entity profiles based on different groupings to do an analysis, the computer may not include every entity profile that should be included in the grouping for the analysis. Thus, the analysis may be incomplete or incorrect.

In one example, a user may wish to determine which entity profiles in a database maintained by a banking system correspond to or represent individuals that reside in the same household. A computer not using the methods described herein may simply match the addresses between different entity profiles and determine the matching addresses means the entities belong to the same household. Other computers may store identifiers of the households in the profiles themselves. However, implementing each of these methods may result in an incorrect household identification because individuals are liable to move households (e.g., children may move off to college or leave the house after starting a new job) without updating their profile information. Further, because these attributes are manually input by users, the attributes may not be correct because of a typo or failure to add the household attribute to the profiles.

Implementations of the systems and methods discussed herein overcome these technical deficiencies because they provide a method for automatically updating entity profiles with group entity labels. The group entity labels may be values that indicate that entity profiles are profiles for individuals that are associated with or a part of the same group entity (e.g., part of the same household or organization). A computer may evaluate attribute-value pairs of individual entity profiles by comparing the attribute-value pairs against each other. The computer may use a specific set of rules that include combinations of different attribute-value pairs that, upon determined to be a match, cause the computer to determine the individuals are a part of the same group. The computer may update the individuals' profiles with value that indicates the group entity. Thus, the profiles may be filtered and/or analyzed as being associated with the same group entity.

In some instances, there may be attribute-value pairs that have different real-world limitations that may cause the pairs to be considered differently when determining whether entity profiles are associated with the same group entity. Continuing with the banking system example, there may be instances in which individuals share the same bank account (e.g., a joint account). Accordingly, the individuals' entity profiles may each have the same account number in their corresponding account number attribute-value pair. Such attribute-value pairs may be assigned to a different set of rules that are separate from other sets of rules because such attribute-value pairs may have real-world characteristics that indicate whether individuals are associated with the same group entity (e.g., a matching joint account number and last name combination may not be an accurate indicator of whether a father and daughter are a part of the same household because the daughter may have kept the same joint account after moving out of the house). These unique sets of rules may later be synthesized together based on a common entity profile to build out the entity profiles that are associated with the same group entity, thereby improving the accuracy of the entity profiles that are associated with the group entity.

Another advantage to splitting the rules into different sets based on the attributes of the rules is to avoid misidentifying a group of entity profiles that is too large. For instance, if a computer is attempting to identify entity profiles of individuals that reside in the same household, the computer may seek to avoid identifying large public group entities that may share common characteristics such as addresses, but may not be considered a household (e.g., a jail or a college dormitory). The computer may set thresholds for the different sets of rules, determine the number of entity profiles that match each other based on each set of rules, and determine whether the number exceeds either threshold. If the computer identifies a set of rules with a number of entity profiles that exceeds a threshold, the computer may determine it is unclear whether the entity profiles are associated with the same household and the computer may not group them together (e.g., not update the respective entity profiles with a group entity label). The computer may compare the number of entity profiles that were identified as matching based on both sets of rules to the thresholds and either only group the entity profiles together that match based on a set of rules that did not exceed a threshold or not group any group of entity profiles together for a group entity if one of the sets exceeds a threshold. Thus, the computer may accurately group the entity profiles together for a user seeking to filter entity profiles by group entity and avoid inaccurate groupings.

Yet another advantage to splitting the rules into different sets based on the attributes of the rules is to allow the system to accurately identify large households. For example, as described above, the system may be configured to avoid grouping entity profiles into group entities that are too large to be considered a household by setting a maximum entity profile threshold for each set of rules. While this may help avoid misclassifying entity profiles into improper households, it may also cause for the system to fail to identify large households that happen to have a number of entity profiles that are a part of the household that would be filtered out based on the thresholds. To overcome this issue, a data processing system may split the rules into different sets to allow for the system to apply the thresholds to the different sets to filter out improper households, but not set any thresholds to the sets of entity profiles that have been synthesized together (e.g., sets of entity profiles from the different sets of rules that were synthesized based on the sets having a common entity profile). In this way, the system may accurately identify households that would otherwise generally be considered to be too large.

Furthermore, one advantage of avoiding inaccurate groupings is it improves processing efficiency and lessens the data storage requirements for processing and storing entity profiles. For instance, when attempting to analyze entity profiles based on their groupings (whether it is just counting the number of entity profiles that are in particular groups, filtering the entity profiles based on the grouping, or identifying the online actions of entity profiles of the groups), a computer may not use the processing resources to process the data of improper group entities. Further, different group entities may have profiles that may be stored in memory and have storage requirements. Avoiding improper entity profile groupings may lessen the number of group entity profiles a computer needs to store in memory. Thus, by implementing the systems and methods described herein, a computer may have more memory and processing resources to process applications that the computer may execute.

FIG. 1 illustrates an example system 100 for household entity generation, in some embodiments. In brief overview, system 100 can include two client devices 102 and 104 that communicate with a household entity generator 106 over a network 108. These components may operate together to identify different entity profiles that can be grouped together and update the entity profiles based on the groupings. System 100 may include more, fewer, or different components than shown in FIG. 1. For example, there may be any number of client devices, computers that make up or are a part of household entity generator 106 or networks in system 100.

Client devices 102 and 104 and/or household entity generator 106 can include or execute on one or more processors or computing devices and/or communicate via network 108. Network 108 can include computer networks such as the Internet, local, wide, metro, or other area networks, intranets, satellite networks, and other communication networks such as voice or data mobile telephone networks. Network 108 can be used to access information resources such as web pages, websites, domain names, or uniform resource locators that can be presented, output, rendered, or displayed on at least one computing device (e.g., client device 102 or 104), such as a laptop, desktop, tablet, personal digital assistant, smartphone, portable computers, or speaker. For example, via network 108, client devices 102 and 104 can access entity profiles that are stored on household entity generator 106.

Each of client devices 102 and 104 and/or household entity generator 106 can include or utilize at least one processing unit or other logic devices such as a programmable logic array engine or a module configured to communicate with one another or other resources or databases. The components of client devices 102 and 104 and/or household entity generator 106 can be separate components or a single component. System 100 and its components can include hardware elements, such as one or more processors, logic devices, or circuits.

Household entity generator 106 may comprise one or more processors that are configured to analyze and update entity profiles based on the entity profiles corresponding to individuals that are a part of the same group (e.g., reside in the same household). Household entity generator 106 may comprise a network interface 110, a processor 112, and/or memory 114. Household entity generator 106 may communicate with client devices 102 and 104 via network interface 110. Processor 112 may be or include an ASIC, one or more FPGAs, a DSP, circuits containing one or more processing components, circuitry for supporting a microprocessor, a group of processing components, or other suitable electronic processing components. In some embodiments, processor 112 may execute computer code or modules (e.g., executable code, object code, source code, script code, machine code, etc.) stored in memory 114 to facilitate the activities described herein. Memory 114 may be any volatile or non-volatile computer-readable storage medium capable of storing data or computer code.

Memory 114 may include an event identifier 116, a profile matcher 118, a profile parser 120, a profile updater 122, a rule database 124, and/or a profile database 126, in some embodiments. In brief overview, components 116-126 may cooperate to store entity profiles in profile database 126 that are accessible to different individuals, detect the occurrence of an event that causes components 118-126 to identify groupings of entity profiles, identify entity profiles that match and are associated with the same group entity based on one or more sets of rules, filter out any matched entity profiles that may not be associated with a group entity, and update the profiles according to the matched group entity. In some embodiments, the components 116-126 may generate new group profiles based on new matches and store the group profiles in profile database 126 such that the group profiles may be analyzed based on the entity profiles that are associated with the respective group profiles.

Household entity generator 106 may store entity profiles in profile database 126. Entity profiles may be accounts for different individuals such as bank account, credit card accounts, user profiles with different websites, etc. The entity profiles may include attribute-value pairs that each include a different attribute and a value for the attribute. For example, the entity profiles may include attribute-value pairs for first name, last name, full name, address, phone number, cell phone number, home phone number, tax identification number, street name, zip code, city, state, account number, household identification number, group entity number, company identification number, etc. Household entity generator 106 may initially store the entity profiles with attribute-value pairs with blank values in the data structures for the respective entity profiles. Household entity generator 106 may then add values to the attribute-value pairs as household entity generator 106 receives inputs (e.g., user inputs) indicating the values. Household entity generator 106 may add the values to the attribute-value pairs by updating the respective data structures with the values.

Profile database 126 may include one or more databases (e.g., databases in a distributed system). Profile database 126 may store profiles for different individual entities (e.g., individual people) and/or group entities (e.g., companies, households, organizations, etc.). The individual entity profile may be referred to hereafter as entity profiles and the group entity profiles as group entity profiles. The entity profiles may be stored as data structures with one or more attribute-value pairs as described above. The group entity profiles may similarly be stored as data structures with attribute-value pairs (e.g., name, address, phone number, number of employees, names of the employees, number of people in the household, type of business, etc.). The different profiles that are stored in profile database 126 may be updated over time as household entity generator 106 either receives new values for the profiles or determines values for profiles.

Event identifier 116 may comprise programmable instructions that, upon execution, cause processor 112 to identify or detect a profile refresh event occurred that causes components 118-122 to analyze and update entity profiles in profile database 126. A profile refresh event may be any event that causes event identifier 116 to evaluate the entity profiles that are stored in memory 114 of household entity generator 106 to determine whether they are associated with a particular group entity. Profile refresh events may be stored rules in memory 114 that causes household entity generator 106 to evaluate the entity profiles. Examples of profile refresh events may include detecting a user input at a user interface (e.g., detecting a selection of a profile refresh button), detecting a time period (e.g., a predetermined time period) has passed since the last instance household entity generator 106 evaluated the entity profiles, detecting the addition of a new entity profile to memory 114, detecting the number of entity profiles stored in memory 114 exceeds a threshold, detecting a number of entity profiles have been added to memory 114 since the last instance household entity generator 106 evaluated the entity profiles, etc. In some embodiments, household entity generator 106 may evaluate the different rules of the profile refresh events over time and/or each time household entity generator 106 adds an entity profile to memory 114.

Profile matcher 118 may comprise programmable instructions that, upon execution, cause processor 112 to apply sets of rules from rule database 124 to the profiles of profile database 126 after event identifier 116 detects a profile refresh event. Rule database 124 may be a relational database that stores any number of rules that can be used to match entity profiles together. For instance, profile matcher 118 may apply a first set of rules from rule database 124 to the attribute-value pairs of the entity profiles to identify entity profiles with specific sets of matching attribute-value pairs. The first set of rules may include matching rules for one or more attribute-value pairs (e.g., entity profiles may be a match between each other for a rule if a specific set of attribute-value pairs match). For instance, one rule may indicate two profiles are a match between each other if they have a match between the last name, street number, street name, and zip code attribute-value pairs. Another rule may indicate two profiles are a match if the profiles have matching last name, street name, city, and state attribute-value pairs. Yet another rule may account for last names with more than one token (e.g., name) and may indicate a match if they have at least one matching token in the last name attribute-value pair and a match between the street number, street name, and zip code attribute-value pairs. The first set of rules may include any number of rules for any attributes.

In some embodiments, the rules may specify that the attribute-value pairs are a match if the values of the attribute-value pairs do not exactly match, but instead only approximately match. For instance, some rules may specify that last names may be a fuzzy match if they match according to a phonetic function (e.g., a phonetic hashing function). Profile matcher 118 may apply such rules by applying the phonetic hashing function to each last name attribute-value pair of the entity profiles and determine matches between the resulting hashes to be a fuzzy match. Some rules may specify that attribute-value pairs are a fuzzy match if they are a match within a threshold as determined using an edit distance function (e.g., Levenshtein or Cosine Similarity). Profile matcher 118 may apply the edit distance function between corresponding attribute-value pairs and determine how many changes would need to occur before the values match. Profile matcher 118 may compare the number of changes to a threshold (e.g., a predetermined threshold). Profile matcher 118 may determine any values with a number of changes below the threshold are a match and values with a number of changes above the threshold are not a match. In some embodiments, the value of the threshold may differ depending on the length of the value (e.g., the number of characters of the value). For instance, profile matcher 118 may determine longer street names correspond to higher thresholds. This may be beneficial because the longer the value, the higher the chance for any typographical errors in the name. Rules may use phonetic functions and/or edit distance functions to determine matches for any attributes. In some embodiments, profile matcher 118 may use phonetic functions and/or edit distance functions to determine exact matches.

In some embodiments, individual rules may include a combination of exact matches and fuzzy matches for different attributes. For instance, one rule may indicate two entity profiles are a match if the last name and street name attribute-value pairs are fuzzy matches (e.g., a fuzzy match based on a phonetic function and/or an edit distance function) and the street number and city and state attribute-value pairs are exact matches. Another rule may indicate two profiles are a match if the same attributes are all fuzzy matches. Yet another rule may indicate two profiles are a match if the same attributes are all exact matches. The rules may have any combination of exact and/or fuzzy matches for any combination of attribute-value pairs.

In some embodiments, the first set of rules may be divided into different subsets of rules. The first set of rules may be divided based on the attribute-value pairs that are included in the rules. For instance, one subset of rules may include different variations of attribute-value pairs that each include a last name attribute-value pair (e.g., an exact matching last name, a fuzzy matching last name, or a last name inclusion). Another set of rules may each include a phone number attribute-value pair (e.g., an exact or fuzzy home and/or cell phone number). Yet another set of rules may each include an email attribute-value pair. Thus, profile matcher 118 may be able to divide the matching sets of entity profiles based on the types of attribute-value pairs that match that each may have different levels of contributions that indicate whether the entity profiles are associated with the same group entity.

By applying the first set of rules to the attribute-value pairs of the entity profiles, profile matcher 118 may determine if the entity profiles are associated with a common group entity, such as a household (e.g., the individuals that correspond to the entity profiles are members of the same household). Profile matcher 118 may identify any entity profiles that profile matcher 118 determines to be a match as candidate profiles for being associated with the same group entity.

In some embodiments, profile matcher 118 may erase or delete any pre-stored group entity labels that were previously stored in the entity profiles before applying the first set of rules to the entity profiles. For instance, the households of different individuals may change over time as people move from and/or are added to different households. Upon moving households, the individuals may not update their household information in their entity profiles. Instead, the individuals may update their other information, such as their new address and/or phone number. Accordingly, profile matcher 118 may need to cleanse and refresh the household labels for all entity profiles that are stored in memory 114 upon detecting each profile refresh event (e.g., using a batch processing technique). By doing so, profile matcher 118 may ensure the entity profiles stay up-to-date and that the entity profiles do not contain stale or incorrect data.

In some embodiments, before applying the first set of rules to the entity profiles, profile matcher 118 may use a normalization technique on their attribute-value pairs. For example, profile matcher 118 may normalize five attributes: last name, address, phone number, email, and/or joint account number. An example of such normalization may include normalizing last names that have composite tokens that are connected by a hyphen (e.g., Aranda-Gonzalez). Profile matcher 118 may replace the hyphen with a white space. Another example of such normalization may include unifying all zip codes to five digits by converting any zip code strings with nine digits to five-digit strings with the remaining digits replaced with null values. Normalization techniques may help avoid variations with the attributes (e.g., avoid instances where one entity profile includes a composite last name and another entity profile has the otherwise same last name but without the hyphen). Any normalization technique may be used to normalize any attribute-value pairs.

Profile matcher 118 may label the entity profiles according to the rules that caused the profiles to be a match. Profile matcher 118 may do so in response to profile matcher 118 identifying at least one pair of entity profiles that match according to the first set of rules. For instance, each rule may correspond to a different label that may have a stored association (e.g., a relationship in rule database 124) with the rule. The first set of rules may have labels such as 1, 1.1, 1.2, 1.3, 1.4, etc. Upon identifying entity profiles that match, profile matcher 118 may identify the labels of the rules that caused the entity profiles to match. Profile matcher 118 may retrieve the labels and update the entity profiles with the retrieved labels to indicate the match (e.g., update the entity profiles by adding the labels to one or more intermediary label attribute-value pairs of the profiles). Thus, profile matcher 118 may identify the candidate entities that may be associated with a household by labeling the entity profiles with the matching labels.

In some embodiments, profile matcher 118 may apply labels to the matching entity profiles based on the different subsets of rules. For instance, each subset of rules may have a different initial value associated with the subset (e.g., one subset may include the labels 1, 1.1, 1.2, 1.3, etc., and another subset may include the labels 2, 2.1, 2.2, 2.3, 2.4, etc.). Profile matcher 118 may retrieve the labels associated with the different subsets and update the matching entity profiles based on the labels to indicate the subsets of the first set of rules that caused the entity profiles to match between each other. Profile parser 120 may then determine if the different candidate entity profiles may be updated with a group entity label.

Profile parser 120 may comprise programmable instructions that, upon execution, cause processor 112 to determine if the candidate profiles that profile matcher identifies can be updated with a group entity label. Profile parser 120 may identify the number of profiles that are associated with the same group entity. To do so, profile parser 120 may synthesize the entity profiles based on the matching entity profiles sharing a common entity profile. For instance, profile parser 120 may determine entity profile A matches entity profile B and entity profile B matches entity profile C. Because the matches between entity profiles A and B and entity profiles B and C share a common entity profile (e.g., entity profile B), profile parser 120 may determine entity profiles A, B, and C are candidate entity profiles for the same group entity. Continuing with this example, entity profiles C and D may be a match, entity profiles E and F may be a match, and entity profiles F and G may be a match. Because entity profiles A, B, and C share a common entity profile with the match between entity profiles C and D, entity profile D may be added to the group of A, B, and C as a candidate entity profile for the same group entity. Meanwhile, entity profiles E, F, and G may be candidate entity profiles for another group entity because entity profile F is a common entity profile between the two matches and the entity profiles do not share a match with entity profiles A, B, C, and D. By synthesizing entity profiles in this way, profile parser 120 may identify sets of entity profiles that satisfy the first set of rules for different group entity based on the sets of entity profiles having matching attribute-value pairs.

Profile parser 120 may generate a list for each group entity that includes the candidate entity profiles for the group entity. Profile parser 120 may maintain a counter for each list and increment the counters for each entity profile on the list. Profile parser 120 may determine the number of candidate entity profiles that are associated with each group entity as the count of the counter.

Profile parser 120 may determine if the number of candidate entity profiles of a set of entity profiles exceeds a threshold. The threshold may be a defined threshold (e.g., 4, 5, 6, 7, 8, 9, etc.). Profile parser 120 may compare the number of candidate entities profiles to the threshold and determine if the number exceeds the threshold. Advantageously, by doing so, profile parser 120 may avoid incorrectly assigning a group entity label to entity profiles. For instance, if profile parser 120 is grouping the entity profiles into individual households, profile parser 120 would not include public areas (e.g., jails or college dormitories) as households that may result in a number of entity that exceeds the threshold.

If profile parser 120 identifies a set of entity profiles for a group entity that exceeds the threshold, profile parser 120 may discard the labels on the set of entity profiles. Profile parser 120 may discard the labels by removing the intermediary labels from the entity profiles that indicate the entity profiles match, leaving the intermediary label and group entity attribute-value pairs for the entity profiles blank. In some embodiments, in instances in which the entity profiles previously had a group entity label in the group entity attribute-value pair, profile parser 120 may remove the group entity label from the attribute-value pair. In embodiments in which profile parser 120 cleanses group entity labels prior to applying the first set of rules, profile parser 120 may discard a previous group entity label from an entity profile during the cleansing and leave the group entity attribute-value pair blank upon refreshing the group entity attribute-value pair labels for the entity profiles. This may occur when profile parser 120 has more data for other entity profiles that causes another subset of entity profiles to match the first set of entity profiles and the match causes the first set of entity profiles to exceed the threshold after synthesis.

Profile matcher 118 may apply a second set of rules to the entity profiles. The second set of rules may be similar to the first set of rules, but include a distinct set of attribute-value pairs in the set. For example, each rule in the second set of rules may at least include an account number attribute-value pair that must exactly match between the different entity profiles for the rule to be satisfied. The rules may otherwise have other attribute-value pairs that may either be a fuzzy match or an exact match.

In some embodiments, the second set of rules may be separate from the first set of rules because the attribute-value pair that is common to the second set of rules may be retrieved from another data source (e.g., another computer or database). For instance, while the first set of rules may only include or reference attribute-value pairs that are stored in the data structures of the entity profiles, the second set of rules may include an attribute-value pair that is common across the second set of rules that is stored in another data structure, such as a database or table that stores values for the attribute-value pair. Continuing with the example above, the account number attribute-value pair for the entity profiles may be aggregated and stored in an account table. The account table may be logically and/or physically separate from the database that stores the entity profiles. The account table may include the account numbers and customer identifiers. The customer identifiers may link the entity profiles to the account numbers as a key. Such a storage configuration may be advantageous given a single customer may have multiple account numbers or customer numbers in a one-to-many relationship (e.g., in instances in which a customer has a savings account and a checking account or a child and a parent have different accounts but the same customer number).

For instance, entity profiles may have a customer identifier attribute-value pair but not an account attribute-value pair. Upon applying the second set of rules to the entity profiles, profile matcher 118 may identify the account numbers for the different entity profiles responsive to the account numbers having stored relationships with the same customer numbers as are stored in the entity profiles. Profile matcher 118 may identify the attribute-value pairs of the entity profiles that correspond to the account numbers (e.g., that have a stored relationship with the same customer number) and apply the second set of rules to the entity profiles similar to the first set of rules by identifying entity profiles with attribute-value pairs including the account number attribute-value pair that match.

Examples of rules of the second set of rules include exact account number, street number, and zip code matches and a fuzzy street name match; exact account number and home phone number matches; exact account number and exact cell phone number matches; and exact account number and email matches. The second set of rules may include account number and any combination or variation of attribute-value pairs that match for the rules to be satisfied.

Profile matcher 118 may label the candidate entity profiles of the second set of rules according to the rules that caused the entity profiles to match. Profile matcher 118 may do so in response to profile matcher 118 identifying at least one set of entity profiles that match according to the first set of rules. For instance, each rule of the second set of rules may correspond to a different label that has a stored association with the rule. The second set of rules may have labels such as 3, 3.1, 3.2, 3.3, 3.4, etc. Such labels may be sequential to the last label of the first set of rules or subset of rules (e.g., if the first set of rules includes the labels 1, 1.1, and 1.2, the second set of labels may include the labels 2, 2.1, and 2.2). Upon identifying entity profiles that match according to the second set of rules, profile matcher 118 may identify the labels of the rules that caused the entity profiles to match. Profile matcher 118 may retrieve the labels and update the entity profiles with the retrieved labels to indicate the match. Thus, profile matcher 118 may identify the candidate entities that may be associated with a group entity by labeling the entity profiles with the matching labels.

In some embodiments, similar to the first set of rules, profile matcher 118 may apply labels to the matching entity profiles based on the different subsets of the second set of rules. For instance, each subset of rules may have a different initial value associated with the subset. The labels may be sequential to the last label of the first set of rules or subset of rules (e.g., if the last subset of labels of the first set of rules includes the labels 2, 2.1, and 2.2, the first subset of the second subset of rules may include the labels 3, 3.1, and 3.2). Profile matcher 118 may retrieve the labels associated with the different subsets and update the matching entity profiles based on the labels to indicate the subsets of the second set of rules that caused the entity profiles to match between each other.

Profile parser 120 may identify the number of profiles that are associated with the same group entity. Profile parser 120 may do so in a similar manner to how profile parser 120 identified the number of profiles that are associated with the same group entity for the first set of rules. For instance, profile parser 120 may identify groups of matching entity profiles that share a common entity profile. One such grouping may be a second set of entity profiles. Profile parser 120 may identify any number of such groups. For each group, profile parser 120 may maintain a counter that indicates the number of entity profiles in the group. The count of the counter may indicate the number of entity profiles of the group.

For the second set of entity profiles, profile parser 120 may determine whether the number of entity profiles for a group entity exceeds a threshold. The threshold may be a defined threshold (e.g., 4, 5, 6, 7, 8, 9, etc.). Profile parser 120 may compare the number of candidate entities profiles to the threshold and determine if the number exceeds the threshold. Advantageously, by doing so, profile parser 120 may avoid incorrectly assigning a group entity label to entity profiles similar to how profile parser 120 avoided incorrectly assigning group entity labels to entity profiles for the second set of rules. Profile parser 120 may similarly compare any number of groups or sets of entity profiles to a threshold.

If profile parser 120 identifies a set of candidate entity profiles for a group entity that exceeds the threshold, profile parser 120 may discard the labels on the candidate entity profiles for the group entity. Profile parser 120 may discard the labels similar to how profile parser 120 discards labels for the first set of rules as described above (e.g., fail to update the entity profile attribute-value pair of an entity profile, remove a value for a group entity attribute-value pair from the entity profiles, remove the intermediary labels from the entity profiles, etc.).

Profile updater 122 may comprise programmable instructions that, upon execution, cause processor 112 to update the entity profiles that have been matched with a group entity with a group entity label. To do so, profile updater 122 may determine if there are any entity profiles that are associated with a group entity for which their labels have not been discarded. For instance, profile updater 122 may determine if there are any matching entity profiles that were identified using the first set of rules or the second set of rules that were not labeled with a group entity that exceeds a threshold. Responsive to profile updater 122 determining no such entity profiles exist (e.g., all matching entity profiles were discarded or no matching entity profiles were found), profile updater 122 may generate a record (e.g., a file, document, table, listing, message, notification, etc.) indicating no group entities could be identified. Profile updater 122 may transmit the record to a client device to be displayed on a user interface. By doing so, profile updater 122 may inform an administrator that the entity profiles could not be grouped into different group entities.

However, responsive to determining there is at least one matching profile that has not been discarded, profile updater 122 may update the entity profiles according to the group entities with which they are associated. Profile updater 122 may update the entity profiles of the different sets of entity profiles with group entity labels that indicate the group entities with which they are associated. For example, upon determining there is a set of entity profiles that matches and/or has been synthesized together, profile updater 122 may generate a numeric, alphabetic, or alphanumeric string as a group entity label and add the group entity label to each of the entity profiles of the set (e.g., add a group entity label to the group entity attribute-value pair of each of the entity profiles). Profile updater 122 may generate the group entity label using a random number generator or using data that matches one or a portion of the entity profiles such as a common last name or a common phone number. Profile updater 122 may generate the group entity labels using any method.

In some embodiments, profile updater 122 may generate group entity labels for the entity profiles after synthesizing entity profiles that were identified using the first set of rules and entity profiles that were identified using the second set of rules (e.g., the first and second sets of entity profiles). Profile updater 122 may synthesize the two sets of entity profiles based on the two sets of entity profiles sharing a common entity profile (e.g., the same entity profile is in each set). Profile updater 122 may compare the entity profiles in each set of entity profiles and identify sets with a common entity profile as being associated with the same group entity. Accordingly, when profile updater 122 updates the different sets of entity profiles with group entity labels, profile updater 122 may update entity profiles that were identified using both sets of rules with the same group entity label. In this way, profile updater 122 may enable profile updater 122 to link entity profiles that were identified by only one set of the rules and entity profiles that were only identified using the other set of rules to the same group entity (and therefore each other).

Figure 2:
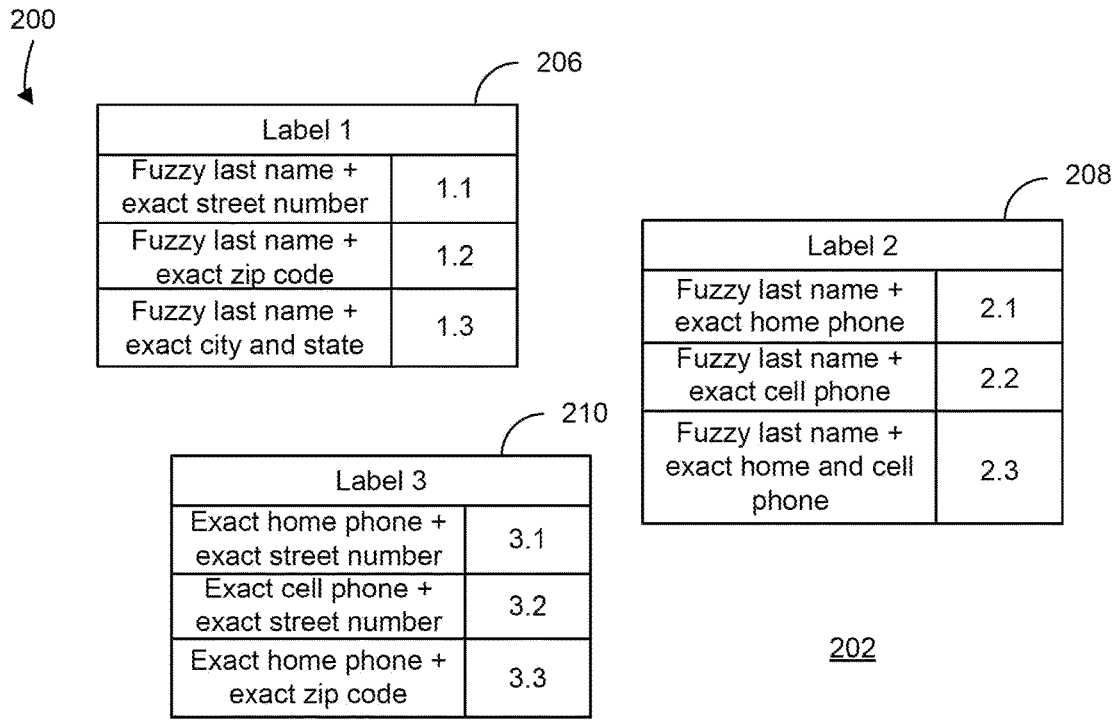
FIG. 2 is an illustration of sets of rules for household entity generation, in accordance with an implementation.

FIG. 2 is an illustration of sets of rules 200 for household entity generation, in accordance with an implementation. Set of rules 200 may be or represent rules that are stored in rule database 124, shown and described with reference to FIG. 1. Sets of rules 200 may include a first set of rules 202 and a second set of rules 204. In some embodiments, first set of rules 202 may have a first matching or identical identifier or label (e.g., 1) and second set of rules 204 may have a second matching or identical identifier or label (e.g., 2) such that the rules may be identified as being a part of different sets when being retrieved. First set of rules 202 may include rules that include a common attribute-value pair between each other or that each exclude a specific attribute-value pair. For example, each rule of first set of rules 202 may include a requirement to have at least the exact same last name or a fuzzy matching last name. In another example, by definition, each rule in first set of rules 202 may not include an account number attribute-value pair. This may be particularly advantageous if the excluded attribute-value pair is stored in another data structure from the entity profiles such as account numbers being stored in a global table or database with common customer identification numbers that act as look-up keys that link the account numbers to different entity profiles. In some cases, the different customer identifiers of different entity profiles may correspond to the same account number or vice versa. Accordingly, using the customer identifiers as look-up keys may enable a data processing system (e.g., household entity generator 106) to identify attribute-value pairs for different entity profiles that correspond to the same account number.

First set of rules 202 may include subsets of rules 206, 208, and 210. Each subset of rules 206, 208, and 210 may have a common attribute-value pair within the rules of the respective subset (e.g., each rule of subset of rules 206 may include a last name attribute-value pair, each rule of subset of rules 208 may include a phone number attribute-value pair, and each rule of subset of rules 210 may include a street address attribute-value pair). Such rules may be designed to determine the group entities with which the individual entity profiles are associated.

Furthermore, each subset of rules 206, 208, and 210 may include rules that have a stored relationship with different labels. For instance, the rules of subset of rules 206 may respectively have stored relationships with the labels 1.1, 1.2, and 1.3; the rules of subset of rules 208 may respectively have stored relationships with the labels 2.1, 2.2, and 2.3; and the rules of subset of rules 210 may respectively have stored relationships with the labels 3.1, 3.2, and 3.3. Upon determining two entity profiles match according to one of these rules, the data processing system may retrieve the label for the rule and update the two matching entity profiles with the label. Thus, the data processing system may update the entity profiles to indicate that they have a match and the rule that caused the match.

Second set of rules 204 may include rules that include a common attribute-value pair between each other. In some embodiments, each of second set of rules 204 may include an attribute-value pair that was excluded from first set of rules 204. For instance, each rule of second set of rules 204 may include an account number attribute-value pair. The account number attribute-value pair may have been explicitly excluded from first set of rules 202 because the account number attribute may be likely to cause false matches in combination one or more of the attribute of first set of rules 202.

Second set of rules 204 may include subsets of rules 212 and 214 that identify different types of attribute-value pairs in addition to the account number. For example, the rules of subset of rules 212 may each include an account number attribute-value pair and a phone number attribute-value pair. The rules of subset of rules 214 may each include an account number attribute-value pair and an email attribute-value pair. Each subset may have stored relationships with labels for each rule of the subset similar to first set of rules 202. The data processing system may apply such labels to entity profiles upon determining the entity profiles match according to the rules of the respective labels. Thus, the data processing system may store indications of the rules that caused the entity profiles to match.

FIG. 3 is an illustration of an example entity profile 300, in accordance with an implementation. Entity profile 300 may be or include a data structure that contains or stores attribute-value pairs for the individual entity profile 300. As illustrated, entity profile 300 may include a name attribute-value pair 302, an account number attribute-value pair 304, a phone number attribute-value pair 306, an email address attribute-value pair 308, an address attribute-value pair 310, and a group entity attribute-value pair 312. However, entity profiles such as entity profile 300 may include any combination of more or less attribute-value pairs. Each attribute-value pair may include a string identifying the attribute and a value (e.g., a numerical, alphabetical, or alphanumerical value) for the attribute-value pair. Such attribute-value pairs may be stored in a database (e.g., profile database 126) with attribute-value pairs of other entity profiles such that a data processing system (e.g., household entity generator 106) may retrieve the attribute-value pairs to identify group entities that are associated with the individual entity profiles.

Entity profile 300 may not include a value for group entity attribute-value pair 312. This may be the case if a user has not input a value for group entity attribute-value pair or the data processing system has not assigned entity profile 300 to a specific group entity. Upon determining entity profile 300 is associated with a group entity, the data processing system may update group entity attribute-value pair 312 with a value indicating the group entity. The data processing system may refresh (e.g., replace with a new value, remove the value, or keep the value the same) this value at each instance the data processing system determines the group entity with which each entity profile is associated.

Figure 4:
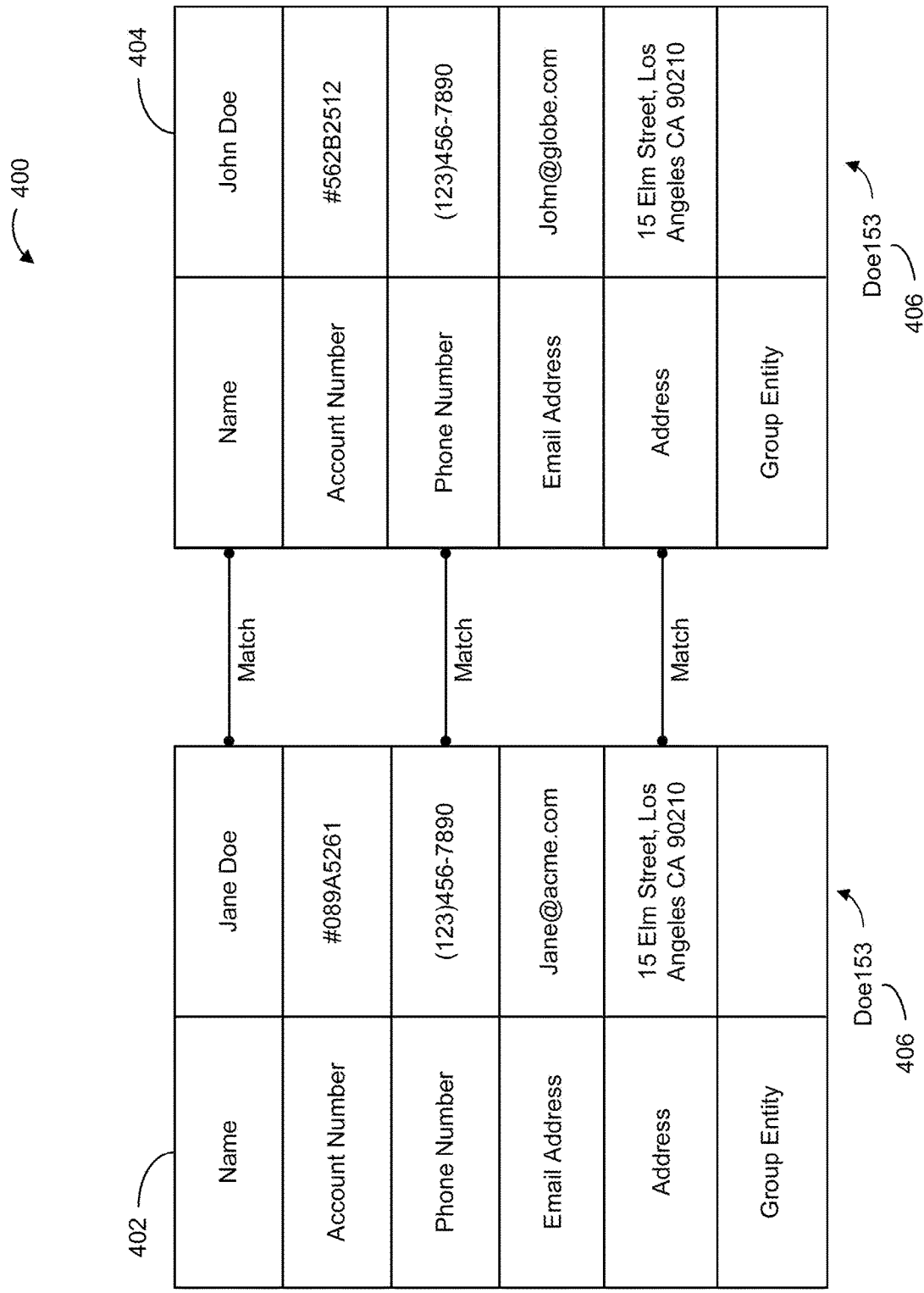
FIG. 4 is an illustration of a comparison between two entity profiles, in accordance with an implementation.

FIG. 4 is an illustration of a comparison 400 between two entity profiles 402 and 404, in accordance with an implementation. A data processing system (e.g., household entity generator 106) may compare entity profiles 402 and 404 by applying one or more sets of rules (e.g., sets of rules 202 and/or 204) to entity profiles 402 and 404. The data processing system may do so by comparing the corresponding attribute-value pairs (e.g., attribute-value pairs of the same type) of entity profiles 402 and 404 between each other and determining whether any of the rules are satisfied based on the comparison. For example, the data processing system may apply a rule that indicates that two entity profiles match if they have the exact same last name, phone number, and address. The data processing system may apply the rule to entity profiles 402 and 404 and determine the rule is satisfied. After determining the rule is satisfied, the data processing system may determine entity profiles are associated with the same group entity and are not a part of a set of entity profiles that exceeds a threshold. Accordingly, the data processing system may update each of entity profiles 402 and 404 with a "Doe153" group entity label 406.

In some embodiments, the data processing system may determine group entity labels, such as the "Doe153" label mentioned above, based on the matching attributes of the matching profiles being labeled. For instance, the data processing system may determine entity profiles 402 and 404 are a match based at least on the last name attribute-value pair "Doe." Accordingly, the data processing system may generate a group entity label of Doe to add to each of entity profiles 402 and 404. The data processing system may select one set of matching attribute-value pairs between matching entity profiles when multiple sets of entity profiles with different matching attribute-value pairs have been synthesized together (e.g., if entity profiles of set A and B and set B and C have been synthesized, the data processing system may select a matching attribute value pair from set A and B or from B and C to use to create the group entity label). The data processing system may determine group entity labels based on any matching attribute-value pair.

In some instances, when generating group entity labels using the above technique, the data processing system may identify multiple group entities that correspond to the same label (e.g., multiple sets of matching entity profiles with the same matching attribute, such as the last name of Doe). In such instances, the data processing system may increment a counter for each label with the same value and concatenate the count of the counter to the end of the label. For example, if the data processing system had previously identified 152 sets of matching entity profiles that have the value Doe, the data processing system may determine the label for the $153^{rd}$ group entity to be Doe153. Accordingly, the data processing system may use the data of the matching attribute-value pairs to generate unique group entity labels for each set of matching entity profiles. In some embodiments, the data processing system may generate the group labels using a random number generator.

Figure 5:
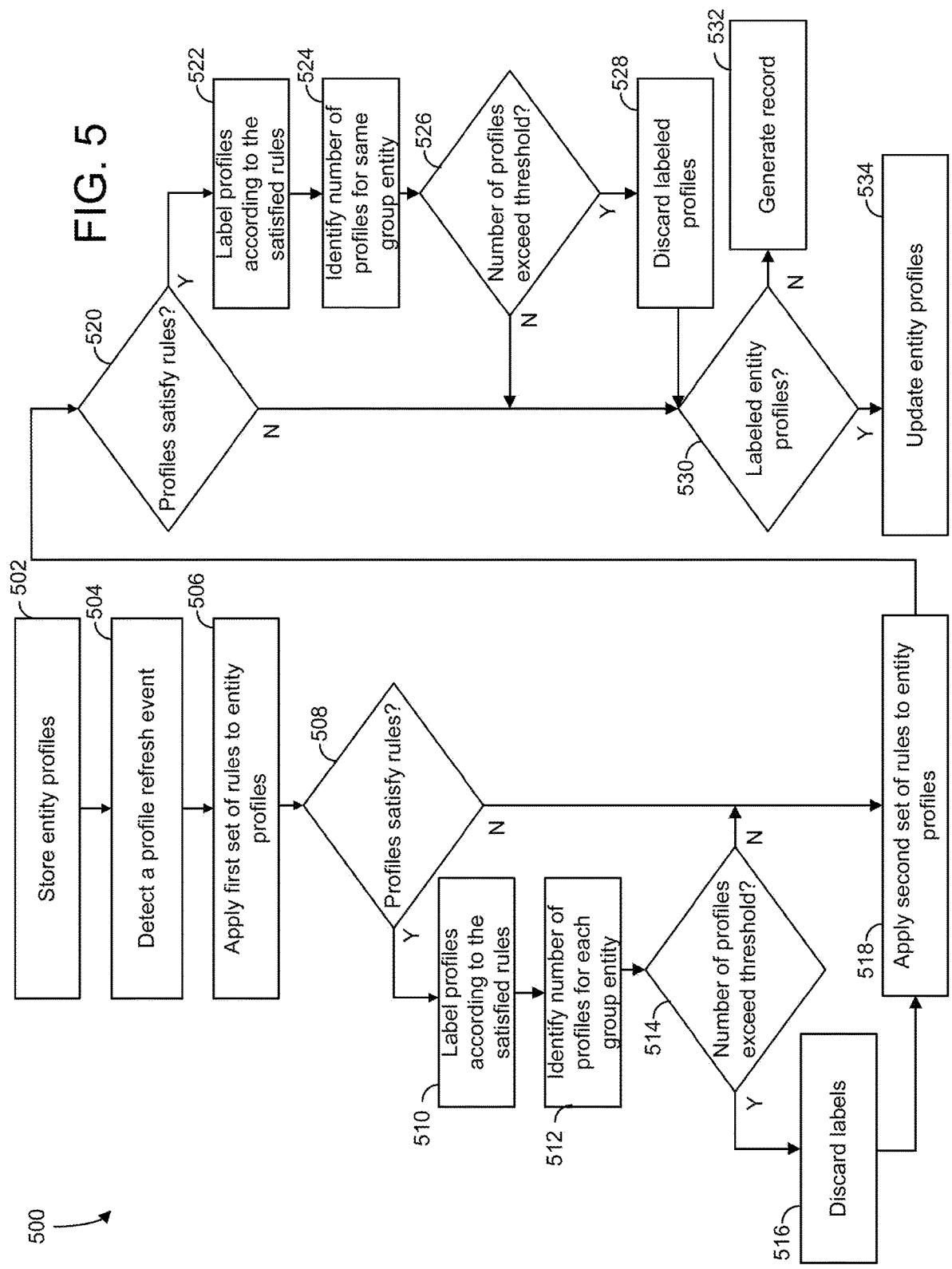
FIG. 5 is an illustration of a method for household entity generation, in accordance with an implementation.

FIG. 5 is an illustration of a method 500 for improved household data generation, in accordance with an implementation. Method 500 can be performed by a data processing system (a client device or a household entity generator 106, shown and described reference to FIG. 1, a server system, etc.). Method 500 may include more or fewer operations and the operations may be performed in any order. Performance of method 500 may enable the data processing system to ingest different entity profiles and correlate the entity profiles with a common group entity (e.g., a household entity). The data processing system may apply different sets of rules to the entity profiles to identify candidate entity profiles that may be associated with individuals of the same group entity. The data processing system may parse the candidate entity profiles to identify entity profiles that are likely not associated with a group entity that meets a predetermined criteria (e.g., a group entity that is not too large). The data processing system may then update the entity profiles to indicate the group entities with which they are associated and/or generate group entity profiles for the group entities. Accordingly, the data processing system may enable the entity profiles to be accurately filtered according to their groups (e.g., based on the entity profiles having matching group entity labels) without relying on a user input to indicate the groups and without misidentifying the entity profiles as being associated with the incorrect group (e.g., misidentifying the entity profiles as being associated with a household when they are located or reside in a jail, dormitory, or another large public space).

At operation 502, the data processing system may store entity profiles. Entity profiles may be accounts for different individuals such as bank account, credit card accounts, user profiles with different web sites, etc. The entity profiles may include attribute-value pairs that each include a different attribute and a value for the attribute. The data processing system may initially store the entity profiles with attribute-value pairs with blank values in the data structures for the respective entity profiles. The data processing system may then add values to the attribute-value pairs as the data processing system receives inputs (e.g., user inputs) indicating the values. The data processing system may add the values to the attribute-value pairs by updating the respective data structures with the values.

The data processing system may store the entity profiles in memory, in some cases in a single or multiple databases. The data processing system may store the entity profiles in a database that may include profiles for different individual entities and/or group entities. The entity profiles may be stored as data structures with one or more attribute-value pairs as described above. The group entity profiles may similarly be stored as data structures with attribute-value pairs. The different profiles that are stored in the database may be updated over time as the data processing system either receives new values for the profiles or determines values for profiles.

At operation 504, the data processing system may detect a profile refresh event. A profile refresh event may be any event that causes the data processing system to evaluate the entity profiles that are stored in memory of the data processing system to determine whether they are associated with a particular group entity. Profile refresh events may be stored rules in the data processing system that, upon being satisfied, causes the data processing system to evaluate the entity profiles. In some embodiments, the data processing system may evaluate the different rules of the profile refresh events over time and/or each time the data processing system adds an entity profile to memory. Upon detecting any of these events occurred, the data processing system may perform operations 506-534 to determine whether the entity profiles are associated with group entities and update the entity profiles accordingly.

After detecting a profile refresh event, at operation 508, the data processing system may apply a first set of rules to the entity profiles. The data processing system may apply the first set of rules to the attribute-value pairs of the entity profiles to identify entity profiles with specific sets of matching attribute-value pairs. The first set of rules may include matching rules for one or more attribute-value pairs (e.g., entity profiles may be a match between each other for a rule if a specific set of attribute-value pairs match). For instance, one rule may indicate two profiles are a match between each other if they have a match between the last name, street number, street name, and zip code attribute-value pairs. Another rule may indicate two profiles are a match if the profiles have matching last name, street name, city, and state attribute-value pairs. The first set of rules may include any number of rules for any attributes.

In some embodiments, the rules may specify that the attribute-value pairs are a match if the values of the attribute-value pairs do not exactly match, but instead only approximately match. For instance, some rules may specify that last names may be a fuzzy match if they match according to a phonetic function (e.g., a phonetic hashing function). The data processing system may apply such rules by applying the phonetic hashing function to each last name attribute-value pair of the entity profiles and determine matches between the resulting hashes to be a fuzzy match. Some rules may specify that attribute-value pairs are a fuzzy match if they are a match within a threshold as determined using an edit distance function. The data processing system may apply the edit distance function between corresponding attribute-value pairs and determine how many changes would need to occur before the values match. The data processing system may compare the number of changes to a threshold (e.g., a predetermined threshold). The data processing system may determine any values with a number of changes below the threshold are a match and values with a number of changes above the threshold are not a match. In some embodiments, the value of the threshold may differ depending on the length of the value (e.g., the number of characters of the value). For instance, the data processing system may determine longer street names correspond to higher thresholds. This may be beneficial because the longer the value, the higher the chance for any typographical errors in the name. Rules may use phonetic functions and/or edit distance functions to determine matches for any attributes. In some embodiments, the data processing system may use phonetic functions and/or edit distance functions to determine exact matches.

In some embodiments, individual rules may include a combination of exact matches and fuzzy matches for different attributes. For instance, one rule may indicate two entity profiles are a match if the last name and street name attribute-value pairs are fuzzy matches (e.g., a fuzzy match based on a phonetic function and/or an edit distance function) and the street number and city and state attribute-value pairs are exact matches. Another rule may indicate two profiles are a match if the same attributes are all fuzzy matches. Yet another rule may indicate two profiles are a match if the same attributes are all exact matches. The rules may have any combination of exact and/or fuzzy matches for any combination of attribute-value pairs.

In some embodiments, the first set of rules may be divided into different subsets of rules. The first set of rules may be divided based on the attribute-value pairs that are included in the rules. For instance, one subset of rules may include different variations of attribute-value pairs that each include a last name attribute-value pair (e.g., an exact matching last name, a fuzzy matching last name, or a last name inclusion). Another set of rules may each include a phone number attribute-value pair (e.g., an exact or fuzzy home and/or cell phone number).

By applying the first set of rules to the attribute-value pairs of the entity profiles, the data processing system may determine if the entity profiles are associated with a common group entity, such as a household (e.g., the individuals that correspond to the entity profiles are members of the same household). The data processing system may identify any entity profiles that the data processing system determines to be a match as candidate profiles for being associated with the same group entity.

In some embodiments, the data processing system may erase or delete any pre-stored group entity labels that were previously stored in the entity profiles before applying the first set of rules to the entity profiles. For instance, the households of different individuals may change over time as people move from and/or are added to different households. Upon moving households, the individuals may not update their household information in their entity profiles. Instead, the individuals may update their other information, such as their new address and/or phone number. Accordingly, the data processing system may need to cleanse and refresh the household labels for all entity profiles that are stored in memory upon detecting each profile refresh event (e.g., using a batch processing technique). By doing so, the data processing system may ensure the entity profiles stay up-to-date and that the entity profiles do not contain stale or incorrect data.

In some embodiments, before applying the first set of rules to the entity profiles, the data processing system may use a normalization technique on their attribute-value pairs. For example, the data processing system may normalize five attributes: last name, address, phone number, email, and/or joint account number. An example of such normalization may include normalizing last names that have composite tokens that are connected by a hyphen (e.g., Aranda-Gonzalez). The data processing system may replace the hyphen with a white space. Another example of such normalization may include unifying all zip codes to five digits by converting any zip code strings with nine digits to five-digit strings with the remaining digits replaced with null values. Normalization techniques may help avoid variations with the attributes (e.g., avoid instances where one entity profile includes a composite last name and another entity profile has the otherwise same last name but without the hyphen). Any normalization technique may be used to normalize any attribute-value pairs.

At operation 508, the data processing system may determine if any of the entity profiles satisfy any of the first set of rules. For instance, the data processing system may compare the attribute-value pairs of the different entity profiles against each other according to the first set of rules and determine if there are any matching entity profiles that satisfy at least one of the first set of rules. The data processing system may identify any matching entity profiles as candidate profiles that may be associated with the same group entity.

At operation 510, the data processing system may label the entity profiles according to the rules that caused the profiles to be a match. The data processing system may do so in response to the data processing system identifying at least one pair of entity profiles that match according to the first set of rules. For instance, each rule may correspond to a different label that may have a stored association (e.g., a relationship in a relational database) with the rule. The first set of rules may have labels such as 1, 1.1, 1.2, 1.3, 1.4, etc. Upon identifying entity profiles that match, the data processing system may identify the labels of the rules that caused the entity profiles to match. The data processing system may retrieve the labels and update the entity profiles with the retrieved labels to indicate the match. Thus, the data processing system may identify the candidate entities that may be associated with a household by labeling the entity profiles with the matching labels.

In some embodiments, the data processing system may apply labels to the matching entity profiles based on the different subsets of rules. For instance, each subset of rules may have a different initial value associated with the subset (e.g., one subset may include the labels 1, 1.1, 1.2, 1.3, etc., and another subset may include the labels 2, 2.1, 2.2, 2.3, 2.4, etc.). The data processing system may retrieve the labels associated with the different subsets and update the matching entity profiles based on the labels to indicate the subsets of the first set of rules that caused the entity profiles to match between each other.

At operation 512, the data processing system may identify the number of profiles that are associated with the same group entity. To do so, the data processing system may synthesize the entity profiles based on the matching entity profiles sharing a common entity profile. For instance, the data processing system may determine entity profile A matches entity profile B and entity profile B matches entity profile C. Because the matches between entity profiles A and B and entity profiles B and C share a common entity profile (e.g., entity profile B), the data processing system may determine entity profiles A, B, and C are candidate entity profiles for the same group entity. Continuing with this example, entity profiles C and D may be a match, entity profiles E and F may be a match, and entity profiles F and G may be a match. Because entity profiles A, B, and C share a common entity profile with the match between entity profiles C and D, entity profile D may be added to the group of A, B, and C as a candidate entity profile for the same group entity. Meanwhile, entity profiles E, F, and G may be candidate entity profiles for another group entity because entity profile F is a common entity profile between the two matches and the entity profiles do not share a match with entity profiles A, B, C, and D. By synthesizing entity profiles in this way, the data processing system may identify sets of entity profiles that satisfy the first set of rules for different group entity based on the sets of entity profiles having matching attribute-value pairs.

The data processing system may generate a list for each group entity that includes the candidate entity profiles for the group entity. The data processing system may maintain a counter for each list and increment the counters for each entity profile on the list. The data processing system may determine the number of candidate entity profiles that are associated with each group entity as the count of the counter.

At operation 514, the data processing system may determine if the number of candidate entity profiles of a set of entity profiles exceeds a threshold. The threshold may be a defined threshold (e.g., 4, 5, 6, 7, 8, 9, etc.). The data processing system may compare the number of candidate entities profiles to the threshold and determine if the number exceeds the threshold. Advantageously, by doing so, the data processing system may avoid incorrectly assigning a group entity label to entity profiles. For instance, if the data processing system is grouping the entity profiles into individual households, the data processing system would not include public areas (e.g., jails or college dormitories) as households that may result in a number of entity that exceeds the threshold.

If the data processing system identifies a set of entity profiles for a group entity that exceeds the threshold, at operation 516, the data processing system may discard the labels on the set of entity profiles. The data processing system may discard the labels by removing the intermediary labels from the entity profiles that indicate the entity profiles match, leaving the intermediary label and group entity attribute-value pairs for the entity profiles blank. In some embodiments, in instances in which the entity profiles previously had a group entity label in the group entity attribute-value pair, the data processing system may remove the group entity label from the attribute-value pair. In embodiments in which the data processing system cleanses group entity labels prior to applying the first set of rules, the data processing system may discard a previous group entity label from an entity profile during the cleansing and leave the group entity attribute-value pair blank upon refreshing the group entity attribute-value pair labels for the entity profiles. This may occur when the data processing system has more data for other entity profiles that causes another subset of entity profiles to match the first set of entity profiles and the match causes the first set of entity profiles to exceed the threshold after synthesis.

At operation 518, the data processing system may apply a second set of rules to the entity profiles. The second set of rules may be similar to the first set of rules, but include a distinct set of attribute-value pairs in the set. For example, each rule in the second set of rules may at least include an account number attribute-value pair that must exactly match between the different entity profiles for the rule to be satisfied. The rules may otherwise have other attribute-value pairs that may either be a fuzzy match or an exact match.

In some embodiments, the second set of rules may be separate from the first set of rules because the attribute-value pair that is common to the second set of rules may be retrieved from another data source (e.g., another data processing system or another database). For instance, while the first set of rules may only include or reference attribute-value pairs that are stored in the data structures of the entity profiles, the second set of rules may include an attribute-value pair that is common across the second set of rules that is stored in another data structure, such as a database or table that stores values for the attribute-value pair. Continuing with the example above, the account number attribute-value pair for the entity profiles may be aggregated and stored in an account table. The account table may be logically and/or physically separate from the database that stores the entity profiles. The account table may include the account numbers and customer identifiers. The customer identifiers may link the entity profiles to the account numbers as a key. Such a storage configuration may be advantageous given a single customer or entity profile may have multiple account numbers or customer numbers in a one-to-many relationship (e.g., in instances in which a customer has a savings account and a checking account or a child and a parent have different accounts but the same customer number).

For instance, entity profiles may have a customer identifier attribute-value pair but not an account attribute-value pair. Upon applying the second set of rules to the entity profiles, the data processing system may identify the account numbers for the different entity profiles responsive to the account numbers having stored relationships with the same customer numbers as are stored in the entity profiles. The data processing system may identify the attribute-value pairs of the entity profiles that correspond to the account numbers (e.g., that have a stored relationship with the same customer number) and apply the second set of rules to the entity profiles similar to the first set of rules by identifying entity profiles with attribute-value pairs including the account number attribute-value pair that match.

Examples of rules of the second set of rules include exact account number, street number, and zip code matches and a fuzzy street name match; exact account number and home phone number matches; exact account number and exact cell phone number matches; and exact account number and email matches. The second set of rules may include account number and any combination or variation of attribute-value pairs that match for the rules to be satisfied.

At operation 520, the data processing system may determine if any of the second set of rules were satisfied. For instance, the data processing system may retrieve the account numbers for the entity profiles based on the entity profiles and account numbers each having a stored relationship with the same customer number. The data processing system may apply the second set of rules to the account numbers and attribute-value pairs of the entity profiles and determine if there are any matching entity profiles that satisfy at least one of the second set of rules. The data processing system may identify any matching entity profiles as candidate profiles that may be associated with the same group entity.

At operation 522, the data processing system may label the candidate entity profiles of the second set of rules according to the rules that caused the entity profiles to match. The data processing system may do so in response to the data processing system identifying at least one set of entity profiles that match according to the first set of rules. For instance, each rule of the second set of rules may correspond to a different label that has a stored association with the rule. The second set of rules may have labels such as 3, 3.1, 3.2, 3.3, 3.4, etc. Such labels may be sequential to the last label of the first set of rules or subset of rules (e.g., if the first set of rules includes the labels 1, 1.1, and 1.2, the second set of labels may include the labels 2, 2.1, and 2.2). Upon identifying entity profiles that match according to the second set of rules, the data processing system may identify the labels of the rules that caused the entity profiles to match. The data processing system may retrieve the labels and update the entity profiles with the retrieved labels to indicate the match. Thus, the data processing system may identify the candidate entities that may be associated with a group entity by labeling the entity profiles with the matching labels.

In some embodiments, similar to the first set of rules, the data processing system may apply labels to the matching entity profiles based on the different subsets of the second set of rules. For instance, each subset of rules may have a different initial value associated with the subset. The labels may be sequential to the last label of the first set of rules or subset of rules (e.g., if the last subset of labels of the first set of rules includes the labels 2, 2.1, and 2.2, the first subset of the second subset of rules may include the labels 3, 3.1, and 3.2). The data processing system may retrieve the labels associated with the different subsets and update the matching entity profiles based on the labels to indicate the subsets of the second set of rules that caused the entity profiles to match between each other.

At operation 524, the data processing system may identify the number of profiles that are associated with the same group entity. The data processing system may do so in a similar manner to how the data processing system identified the number of profiles that are associated with the same group entity for the first set of rules. For instance, the data processing system may identify groups of matching entity profiles that share a common entity profile. One such grouping may be a second set of entity profiles. The data processing system may identify any number of such groups. For each group, the data processing system may maintain a counter that indicates the number of entity profiles in the group. The count of the counter may indicate the number of entity profiles of the group.

At operation 526, for the second set of entity profiles, the data processing system may determine whether the number of entity profiles for a group entity exceeds a threshold. The threshold may be a defined threshold (e.g., 4, 5, 6, 7, 8, 9, etc.). The data processing system may compare the number of candidate entities profiles to the threshold and determine if the number exceeds the threshold. Advantageously, by doing so, the data processing system may avoid incorrectly assigning a group entity label to an entity profile. The data processing system may similarly compare any number of groups or sets of entity profiles to a threshold.

If the data processing system identifies a set of candidate entity profiles for a group entity that exceeds the threshold, at operation 528, the data processing system may discard the labels on the candidate entity profiles for the group entity. The data processing system may discard the labels similar to how the data processing system discards labels for the first set of rules as described above (e.g., fail to update the entity profile attribute-value pair of an entity profile, remove a value for a group entity attribute-value pair from the entity profiles, remove the intermediary labels from the entity profiles, etc.).

At operation 530, the data processing system may determine if there are any entity profiles that are associated with a group entity for which their labels have not been discarded. For instance, the data processing system may determine if there are any matching entity profiles that were identified using the first set of rules or the second set of rules that were not labeled with a group entity that exceeds a threshold. Responsive to the data processing system determining no such entity profiles exist (e.g., all matching entity profiles were discarded or no matching entity profiles were found), at operation 532, the data processing system may generate a record (e.g., a file, document, table, listing, message, notification, etc.) indicating no group entities could be identified. The data processing system may transmit the record to a client device to be displayed on a user interface. By doing so, the data processing system may inform an administrator that the entity profiles could not be grouped into different group entities.

However, responsive to determining there is at least one matching profile that has not been discarded, at operation 534, the data processing system may update the entity profiles according to the group entities with which they are associated. The data processing system may update the entity profiles of the different sets of entity profiles with group entity labels that indicate the group entities with which they are associated. For example, upon determining there is a set of entity profiles that matches and/or has been synthesized together, the data processing system may generate a numeric, alphabetic, or alphanumeric string as a group entity label and add the group entity label to each of the entity profiles of the set (e.g., add a group entity label to the group entity attribute-value pair of each of the entity profiles). The data processing system may generate the group entity label using a random number generator or using data that matches one or a portion of the entity profiles such as a common last name or a common phone number. The data processing system may generate the group entity labels using any method.

In some embodiments, the data processing system may generate group entity labels for the entity profiles after synthesizing entity profiles that were identified using the first set of rules and entity profiles that were identified using the second set of rules (e.g., the first and second sets of entity profiles). The data processing system may synthesize the two sets of entity profiles based on the two sets of entity profiles sharing a common entity profile (e.g., the same entity profile is in each set). The data processing system may compare the entity profiles in each set of entity profiles and identify sets with a common entity profile as being associated with the same group entity. Accordingly, when the data processing system updates the different sets of entity profiles with group entity labels, the data processing system may update entity profiles that were identified using both sets of rules with the same group entity label. In this way, the data processing system may enable the data processing system to link entity profiles that were identified by only one set of the rules and entity profiles that were only identified by the other set of rules to the same group entity (and therefore each other) and for the entity profiles to be filtered (e.g., the data processing system may filter the entity profiles based on the group entity labels in response to receiving a filtering request from a computing device).

In some embodiments, the first or second set of entity profiles exceeding its respective threshold may cause the data processing system to discard the group entity labels for the other set of entity profiles. For example, for a group entity, the data processing system may determine a first set of entity profiles for the group entity exceeds a first threshold and the second set of entity profiles with a common entity profile with the first set of entity profiles does not exceed a second threshold. Responsive to determining the first set of entity profiles exceeds the first threshold, the data processing system may remove the group entity labels from both the first and the second sets of entity profiles or fail to add a group entity label to either set. By doing so, the data processing system may avoid inaccurately labeling entity profiles into households (e.g., private households) when they are instead associated with a public group.

In some embodiments, upon generating a group entity label for a set of entity profiles, the data processing system may generate a group entity profile that corresponds to the group entity label. The group entity profile may include group attribute-value pairs that includes information about the group such as the name of the group entity and a list of the entity profiles that have been labeled with the group entity label of the group entity. The data processing system may maintain such group entity profiles and update the group entity profiles upon each refresh of the database that stores the entity profiles to indicate any entity profiles that have been removed or added to the group entity. In some embodiments, the data processing system determines the group entity no longer satisfies a predetermined criteria (e.g., after receiving more data, the data processing system may determine there are a number of entity profiles with the group entity label that exceed a threshold and the group entity is a public group entity rather than a household group entity). In such embodiments, the data processing system may delete the group entity from memory. In this way, the data processing system may preserve memory and processing resources.

Solution Design

In an example implementation, a data processing system (e.g., household entity generator 106) may use two attribute-value pairs together to define matches between two entity profiles for a group entity label. For instance, the data processing system may use the last name and address attribute-value pairs to define a match. In some embodiments, neither last name nor address may be used alone to define a match. In some embodiments, the data processing system may not use more than two attributes at the same time, as it may generate fewer matches. A full address may include street number, street name, city, state, and zip code. The address may be an important attribute-value pair and it may have the highest number of variations compared to other attribute-value pairs.

To apply a first set of rules to entity profiles stored in a database, first, the data processing system may separate zip code from the city and state in an address attribute-value pair because the data processing system may identify the same address and zip code may come with different city names. For instance, the two strings, 449 Commerce Drive, Woodbury, MN 55125, and 449 Commerce Drive, Saint Paul, MN 55125, may both be valid address values and be directed to the same location. In some embodiments, the data processing system may only apply fuzzy comparisons to street names, where the variations may be the most likely to take place. For instance, there may be abbreviations in the street names, like 'Commerce Dr' vs 'Commerce Drive', or the street direction may appear in the front or at the end of the street name, like 'Lake Road S' vs 'S Lake Road'. A rule may have a first group entity label and be defined as follows:

'fuzzy last name+exact street number+fuzzy street name+exact zip code' (Label 1).

This rule can put the above two address examples together by skipping the city and state information. The data processing system may use phonetic functions to define fuzzy last names, while for fuzzy street names, the data processing system may apply edit distance measures. The threshold value of the edit distance measures could be adjustable based on the length of the street names. A similar rule and label could be defined as follows:

'fuzzy last name+exact street number+fuzzy street name+exact city & state' (Label 1.1).

replace exact zip code with exact city & state. The rule associated with Label 1 may be useful when the same location has different city names, while Label 1.1 may be useful when the zip code value has typos or is missing. Label 1.1 and Label 1 may have many overlaps. The data processing system may unify or synthesize the entity profiles that were identified based on the rules associated with labels 1 and 1.1, thus removing all the overlaps, in a later stage.

In some embodiments, when the last name has more than one token like 'ARANDA GONZALEZ', the data processing system may consider the following two rules and labels:

'last name inclusion+exact street number+fuzzy street name+exact zip code' (Label 1.2), and 'last name inclusion+exact street number+fuzzy
    street name+exact city & state' (Label 1.3).

With the name inclusion rule, by leveraging the similarity of addresses, the last name ARANDA GONZALEZ' could be matched with ARANDA' or 'GONZALEZ'. Note that in the customer profile table, the same record may have more than one address fields, like address1 and address2, each of which may contain valid address information. The rules associated with Label 1 and its variations (Label 1.1-1.3) may include address 1 and/or address 2 respectively.

In some embodiments, as discussed above, two household members may have different address values or different last names in a customer profile table. To address this issue, the data processing system may store rules that include combinations of attribute-value pairs such as last name+phone, last name+email, phone+address, email+address, and email+phone. Such rules may be labeled with a label 2 as follows:

'fuzzy last name+exact home phone' (Label 2),

'fuzzy last name+exact cell phone' (Label 2.1), and

'fuzzy last name+exact home phone vs exact cell
    phone' (Label 2.2).

In some embodiments, entity profiles may have two phone fields, home phone and cell phone. The data processing system may store rules to account for three different scenarios, home phone vs home phone, cell phone vs cell phone, and home phone vs cell phone. For the rules associated with Labels 2-2.2, the data processing system may apply fuzzy comparisons on the last names, and exact matches on the phones. The remaining variations of Label 2 may be defined as follows:

'last name inclusion+exact home phone' (Label 2.3),

'last name inclusion+exact cell phone' (Label 2.4),

'last name inclusion+exact home phone vs cell
    phone' (Label 2.5), and

'last name inclusion+exact cell phone vs home
    phone' (Label 2.6).

In some embodiments, last name inclusion may be a one-way direction, Label 2.5 and 2.6 may not be exchangeable, so both are listed here. The different combinations of phones and addresses are defined in the rules with the Labels 3-3.5 as follows:

'exact home phone+exact street number+fuzzy street
    name+exact zip code' (Label 3), 'exact cell phone+exact street number+fuzzy street
    name+exact zip code' (Label 3.1), 'exact home phone vs cell phone+exact street number+fuzzy street name+exact zip code' (Label 3.2), 'exact home phone+exact street number+fuzzy street
    name+exact city & state' (Label 3.3), 'exact cell phone+exact street number+fuzzy street
    name+exact city & state' (Label 3.4), and 'exact home phone vs cell phone+exact street number+fuzzy street name+exact city & state' (Label 3.5).

To apply the rules with the Labels 3-3.5, the data processing system may apply fuzzy comparisons on the addresses, and exact matches on the phones.

In some embodiments, the data processing system may apply rules that include different combinations of last name and email attribute-value pairs. Email may be a special attribute-value pair because a small variation could lead to two different people. For instance, the emails smith012@acme.com and smith013@acme.com could belong to two different people. Fuzzy matches on the emails could relatively easily trigger false alarms. Therefore, to apply the rules that correspond to labels 4 and 4.1, the data processing system may apply fuzzy comparisons on the last names, and exact matches on the emails:

'fuzzy last name+exact email' (Label 4), and

'last name inclusion+exact email' (Label 4.1).

In some embodiments, the data processing system may apply rules that include different combinations of exact email and fuzzy address attribute-value pairs. Such rules may be associated with a Label 5 and its variations as shown below:

'exact email+exact street number+fuzzy street
    name+exact zip code' (Label 5), and 'exact email+exact street number+fuzzy street
    name+exact city & state' (Label 5.1).

In some embodiments, the data processing system may apply rules that include different combinations of exact phone numbers and exact emails. Such rules may be associated with a label 6 and its variations as shown below:

'exact home phone+exact email' (Label 6),

'exact cell phone+exact email' (Label 6.1), and

'exact home phone vs cell phone+exact email' (Label 6.2).

Each label in the six sets may have its own contributions to define proper households, but there should be a lot of overlaps among these many labels. The data processing system may use a Graph Theory application (e.g., a Connected Component Algorithm) to integrate all the labels together to define an intermediate label. For example, Label 1 may define a group of {A, B} and Label 2 may define a group of {B, C}. The data processing system may synthesize the two groups together to obtain a group of {A, B, C}, which means A, B, and C belong to the same group entity (e.g., same household). At this stage, the data processing system may be configured to set up the maximum number of members of any intermediate label to be 7 (or any other value) because it may be unlikely that any group entity, such as a household, includes more than 7 members. Accordingly, any intermediate labels whose size is greater than 7 will become void (e.g., the data processing system may remove the intermediary labels from any group that exceeds 7 members.

Furthermore, the data processing system may also use a second set of rules that include the joint account information, which may be stored in a separate data structure or database from the entity profiles. The data processing system may have such a storage configuration because an account product could be owned by multiple customers, who may accordingly own the same account number. For example, a customer may have multiple account products with the same financial institute, so it would be one-to-many relationships between the customer ID and account number. Using the customer ID as a key, the data processing system join the account number with the attribute-value pairs of the entity profiles (e.g., identify the attribute-value pairs of entity profiles that correspond to different account numbers). The data processing system may store three different subsets of rules that includes the account numbers, such subsets may include: account number and address, account number and phone, and account number and email. In some embodiments, there might be a case in which an adult child and his/her father share the same account but live in different dwelling units and file tax returns separately. Therefore, the data processing system may not include a rule that includes the combination of account number+last name attribute-value pairs. A subset of rules that includes account number and address may be associated with the Label 7 and its variations is shown below:

'exact account number+exact street number+fuzzy
    street name+exact zip code'     (Label 7), and 'exact account number+exact street number+fuzzy
    street name+exact city & state'     (Label 7.1).

A subset of rules that includes account number and phone may be associated with the Label 8 and its variations is shown below:

'exact account number+exact home phone'     (Label 8),

'exact account number+exact cell phone'     (Label 8.1), and

'exact account number+exact home phone vs cell
    phone'     (Label 8.2).

The subset of rules that includes account number and address may be associated with the Label 9:

'exact account number+exact email'.     (Label 9).

The data processing system may synthesize the entity profiles that were identified as matching to integrate the three sets of labels (Lab 7-9) to generate another group of profiles with intermediate labels. The maximum number of the members of the new intermediate labels may be set to 7 or another threshold (e.g., the same or a different threshold from the first set of rules to avoid using this set of rules to identify a household that is too large.

The data processing system may finally apply the Connected Component Algorithm to unify the two sets of intermediate labels, and then generate a final household label for each entity profile. For the final labels, the data processing system may not set a limit to the number of entity profiles. Therefore, the size of the final synthesized could be greater than 7 or another threshold. However, because of how the rules for each intermediate set of entity profiles are divided, the percentage of those final labels would be small and may accurately predict households that exceed 7 or a threshold number of members.

In summary, a data processing system may split the sets of rules to identify entity profiles for individual group entities, one set that corresponds to Labels 1-6, and another set that corresponds to Labels 7-9. The data processing system may generate two groups of intermediate labels based on the two sets of rules. In each group, the data processing system may set up the maximum size of the intermediate labels that may differ or be the same between the two sets. The data processing system may then generate the final labels based on the two groups of intermediate labels without placing place an upper limit to the size of the final group. Accordingly, the data processing system may still allow for households to have more than the maximum number of members than is allowed for each intermediary grouping.

Testing Results

The proposed solution was tested with a sample file of 12 million entity profiles, which had a known household ID. Using a previous method to identify different households, among the 12 million entity profiles, 5.38 million would belong to multi-people households, the largest household having 125 entity profiles. However, using the systems and methods described herein, 6.64 million were found to belong to multi-people households, the largest household having 16 entity profiles There were 1.26 million extra entity profiles that could belong to multi-people households, which was a 23.3% increase. About 55% of the 1.26 million entity profiles came from the first set of labels (e.g., matching entity profiles identified using the first set of rules without using joint account information), while 45% came from the second set of labels (e.g., matching entity profiles identified using the second set of rules that take into account joint account information), showing that incorporating the joint account information had a significant impact on the performance of the proposed algorithm. 99.4% of the 6.64 million entity profiles would belong to households with no more than 7 people. Only a small portion (0.6%) would belong to households with more than 7 people. The table below shows the distributions of the household sizes of the two solutions:

| Size of Household | Prior Solution | Proposed Solution | Number Increase |
| --- | --- | --- | --- |
| 2 | 2,049,550 | 2,373,140 | 323,590 |
| 3 | 250,120 | 337,984 | 87,864 |
| 4 | 91,348 | 137,051 | 45,703 |
| 5 | 23,655 | 42,852 | 19,197 |
| 6 | 5,467 | 13,038 | 7,571 |
| 7 | 1,367 | 4,590 | 3,223 |

Among the 5.38 million entity profiles classified by the previous solution, there were 118 thousand entity profiles that could not be found in the 6.64 million entity profiles classified by the proposed algorithm. This means that 98% of the results of the previous solution were included in the new results. The following method was used to verify the results:

Step 1. Select a random set of 20 households from the 118 thousand entity profiles that were only available in the previous solution and select a random set of 20 households from the 1.26 million entity profiles that were only available in the new solution.

Step 2. Manually check the false alarms of the two random sets.

Step 3. Repeat Steps 1 and 2 a number of times.

In the data, the false alarm rate in the first random set was high, while the false alarm rate in the second random set was low. The repeated 'cross validations' showed that the proposed solution could significantly increase the household detection rate while keeping a low false alarm rate.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the client devices 102 and/or 104 or household entity generator 106) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   storing, by one or more processors in a first data structure, a plurality of entity profiles, each of the plurality of entity profiles associated with a different entity and comprising a plurality of attribute-value pairs;
   storing, by the one or more processors, a predetermined first set of rules with a stored association with a first label in a second data structure and a predetermined second set of rules with a stored association with a second label in a third data structure;
   applying, by the one or more processors, the predetermined first set of rules to the plurality of attribute-value pairs of the plurality of entity profiles;
   responsive to identifying, by the one or more processors, a first set of entity profiles that satisfy the predetermined first set of rules based on the first set of entity profiles having a matching first set of attribute-value pairs, inserting, by the one or more processors, the first label into a first field-value pair of each of the first set of entity profiles;
   applying, by the one or more processors, a predetermined second set of rules to the plurality of attribute-value pairs of the plurality of entity profiles;
   responsive to identifying, by the one or more processors, a second set of entity profiles that satisfy the predetermined second set of rules based on the second set of entity profiles having a matching second set of attribute-value pairs, inserting, by the one or more processors, the second label into a second field-value pair of each of the second set of entity profiles;
   comparing, by the one or more processors, the first set of entity profiles with the second set of entity profiles based on the first labels in the first set of entity profiles and the second labels in the second set of entity profiles;

comparing, by the one or more processors, a first entity profile count indicating a total number of entity profiles of the first set of entity profiles to a first threshold and a second entity profile count indicating a total number of entity profiles of the second set of entity profiles to a second threshold; and in response to determining the first entity profile count does not exceed the first threshold and the second entity profile count does not exceed the second threshold, inserting a third label into a third attribute-value pair of each entity profile of the first and second sets of entity profiles responsive to determining the first set of entity profiles and the second set of entity profiles share a common entity profile, the third label linking the first and second sets of entity profiles.

2. The method of claim 1, further comprising:
responsive to determining the first set of entity profiles and the second set of entity profiles share a common entity profile, generating, by the one or more processors, the third label as a numeric, alphabetic, or alphanumeric string.

3. The method of claim 1, further comprising:
identifying, by the one or more processors, a third set of entity profiles that satisfy the predetermined first set of rules;
generating, by the one or more processors, a list of the third set of entity profiles;
comparing, by the one or more processors, a third entity profile count indicating a total number of entity profiles of the third set of entity profiles to the first threshold; and
discarding, by the one or more processors, the list of the third set of entity profiles responsive to determining the third entity profile count exceeds the first threshold.

4. The method of claim 1, wherein identifying the first set of entity profiles that satisfy the predetermined first set of rules comprises:
identifying, by the one or more processors, a first subset of entity profiles responsive to determining the first subset of entity profiles have a fourth attribute-value pair in common;
identifying, by the one or more processors, a second subset of entity profiles responsive to determining the second subset of entity profiles have a fifth attribute-value pair in common; and
combining, by the one or more processors, the first and second subsets of entity profiles into the first set of entity profiles responsive to the first and second subsets having an entity profile in common by inserting the first label into each of the first and second subsets of entity profiles.

5. The method of claim 4, further comprising:
subsequent to inserting the first label into each of the first and second subsets of entity profiles, identifying, by the one or more processors, a third subset of entity profiles responsive to determining the third subset of entity profiles have matching attribute-value pairs;
aggregating, by the one or more processors, the third subset of entity profiles with the first set of entity profiles with the first label to generate a third set of entity profiles responsive to the third subset of entity profiles and the first set of entity profiles having an entity profile in common; and
removing, by the one or more processors, the first label from the first set of entity profiles responsive to determining a third entity profile count indicating a total number of entity profiles of the third set of entity profiles exceeds the first threshold.

6. The method of claim 5, further comprising:
removing, by the one or more processors, the first label from the third subset of entity profiles responsive to determining the third entity profile count exceeds the first threshold.

7. The method of claim 1, wherein identifying the second set of entity profiles that satisfy the predetermined second set of rules comprises:
identifying, by the one or more processors, a first subset of entity profiles responsive to determining the first subset of entity profiles have matching fourth attribute-value pairs;
identifying, by the one or more processors, a second subset of entity profiles responsive to determining the second subset of entity profiles have matching fifth attribute-value pairs; and
combining, by the one or more processors, the first and second subsets of entity profiles into the second set of entity profiles responsive to the first and second subsets having an entity profile in common.

8. The method of claim 7, wherein identifying the first subset of entity profiles comprises determining each of the first subset of entity profiles corresponds to a matching account number, and wherein identifying the second subset of entity profiles comprises determining each of the second subset of entity profiles corresponds to the matching account number, the matching account number stored in a separate data structure from the first subset of entity profiles and the second subset of entity profiles.

9. The method of claim 1, wherein applying the predetermined first set of rules to the plurality of entity profiles comprises:
determining, by the one or more processors using an edit distance function, whether entity profiles have a fourth attribute-value pair that is an exact match and a fifth attribute-value pair that is a non-exact match within a third threshold,
wherein identifying the first set of entity profiles comprises identifying entity profiles that have a fourth attribute-value pair that exactly matches and a fifth attribute-value pair that is a non-exact match within the third threshold.

10. The method of claim 1, further comprising:
subsequent to inserting the third label into the third attribute-value pair of each entity profile of the first and second sets of entity profiles, reapplying, by the one or more processors, the first set of rules and the second set of rules to the plurality of entity profiles;
re-identifying, by the one or more processors, the first set of entity profiles that satisfy the predetermined first set of rules;
re-identifying, by the one or more processors, the second set of entity profiles that satisfy the predetermined second set of rules; and
updating, by the one or more processors, the third attribute-value pair of each entity profile of the first and second sets of entity profiles with the third label responsive to determining the first set of entity profiles and the second set of entity profiles share a common entity profile.

11. A system, the system comprising:
one or more hardware processors configured by machine-readable instructions to:

store a plurality of entity profiles in a first data structure, each of the plurality of entity profiles associated with a different entity and comprising a plurality of attribute-value pairs;
store a predetermined first set of rules with a stored association with a first label in a second data structure and a predetermined second set of rules with a stored association with a second label in a third data structure;
apply the predetermined first set of rules to the plurality of attribute-value pairs of the plurality of entity profiles;
responsive to identifying a first set of entity profiles that satisfy the predetermined first set of rules based on the first set of entity profiles having a matching first set of attribute-value pairs, inserting, by the one or more processors, the first label into a first field-value pair of each of the first set of entity profiles;
apply a predetermined second set of rules to the plurality of attribute-value pairs of the plurality of entity profiles;
responsive to identifying a second set of entity profiles that satisfy the predetermined second set of rules based on the second set of entity profiles having a matching second set of attribute-value pairs, insert the second label into a second field-value pair of each of the second set of entity profiles;
compare the first set of entity profiles with the second set of entity profiles based on the first labels in the first set of entity profiles and the second labels in the second set of entity profiles;
compare a first entity profile count indicating a total number of entity profiles of the first set of entity profiles to a first threshold and a second entity profile count indicating a total number of entity profiles of the second set of entity profiles to a second threshold; and
in response to determining the first entity profile count does not exceed the first threshold and the second entity profile count does not exceed the second threshold, insert a third label into a third attribute-value pair of each entity profile of the first and second sets of entity profiles responsive to determining the first set of entity profiles and the second set of entity profiles share a common entity profile, the third label linking the first and second sets of entity profiles.

12. The system of claim 11, wherein the one or more hardware processors are further configured to:
responsive to determining the first set of entity profiles and the second set of entity profiles share a common entity profile, generate the third label as a numeric, alphabetic, or alphanumeric string.

13. The system of claim 11, wherein the one or more hardware processors are further configured to:
identify a third set of entity profiles that satisfy the predetermined first set of rules;
generate a list of the third set of entity profiles;
compare a third entity profile count indicating a total number of entity profiles in the third set of entity profiles to the first threshold; and
discard the list of the third set of entity profiles responsive to determining the third entity profile count exceeds the first threshold.

14. The system of claim 11, wherein the one or more hardware processors are configured to identify the first set of entity profiles that satisfy the predetermined first set of rules by:
identifying a first subset of entity profiles responsive to determining the first subset of entity profiles have a fourth attribute-value pair in common;
identifying a second subset of entity profiles responsive to determining the second subset of entity profiles have a fifth attribute-value pair in common; and
combining the first and second subsets of entity profiles into the first set of entity profiles responsive to the first and second subsets having an entity profile in common.

15. A non-transitory computer-readable storage medium having instructions embodied thereon, the instructions being executable by one or more processors to perform a method, the method comprising:
storing a plurality of entity profiles in a first data structure, each of the plurality of entity profiles associated with a different entity and comprising a plurality of attribute-value pairs;
storing a predetermined first set of rules with a stored association with a first label in a second data structure and a predetermined second set of rules with a stored association with a second label in a third data structure;
applying a predetermined first set of rules to the plurality of attribute-value pairs of the plurality of entity profiles;
responsive to identifying a first set of entity profiles that satisfy the predetermined first set of rules based on the first set of entity profiles having a matching first set of attribute-value pairs, inserting, by the one or more processors, the first label into a first field-value pair of each of the first set of entity profiles;
applying a predetermined second set of rules to the plurality of attribute-value pairs of the plurality of entity profiles;
responsive to identifying a second set of entity profiles that satisfy the predetermined second set of rules based on the second set of entity profiles having a matching second set of attribute-value pairs, inserting the second label into a second field-value pair of each of the second set of entity profiles;
comparing the first set of entity profiles with the second set of entity profiles based on the first labels in the first set of entity profiles and the second labels in the second set of entity profiles;
comparing a first entity profile count indicating a total number of entity profiles of the first set of entity profiles to a first threshold and a second entity profile count indicating a total number of entity profiles of the second set of entity profiles to a second threshold; and
in response to determining the first entity profile count does not exceed the first threshold and the second entity profile count does not exceed the second threshold, inserting a third label into a third attribute-value pair of each entity profile of the first and second sets of entity profiles responsive to determining the first set of entity profiles and the second set of entity profiles share a common entity profile, the third label linking the first and second sets of entity profiles.

16. The non-transitory computer-readable storage medium of claim 15, wherein the method further comprises:
responsive to determining the first set of entity profiles and the second set of entity profiles share a common entity profile, generating the third label as a numeric, alphabetic, or alphanumeric string.

17. The non-transitory computer-readable storage medium of claim 15, wherein the method further comprises:
- identifying a third set of entity profiles that satisfy the predetermined first set of rules;
- generating a list of the third set of entity profiles;
- comparing a third entity profile count indicating a total number of entity profiles of the third set of entity profiles to the first threshold; and
- discarding the list of the third set of entity profiles responsive to determining the third entity profile count exceeds the first threshold.

* * * * *